USOO6654174B1

(12) United States Patent
Huang

(10) Patent No.: US 6,654,174 B1
(45) Date of Patent: Nov. 25, 2003

(54) MICRO LENS SYSTEMS AND ARTICLES THEREOF

(76) Inventor: Pin Chien Huang, 3F, No. 36, Lane 21, Long Chiang Rd., Taipei (TW)

(*) Notice: Subject to any disclaimer, the term of this patent is extended or adjusted under 35 U.S.C. 154(b) by 0 days.

(21) Appl. No.: 10/140,042

(22) Filed: May 8, 2002

(51) Int. Cl.$^7$ .................... G02B 27/10; G02B 13/20; G02B 5/02
(52) U.S. Cl. .................... 359/619; 359/599; 359/620
(58) Field of Search .................... 359/628, 457, 359/443, 456, 454, 459, 720, 721, 435, 728, 737, 592, 594, 599, 452, 453, 460, 620, 621, 619, 623, 627, 634, 707, 708, 727, 809

(56) References Cited

U.S. PATENT DOCUMENTS 6,278,546 B1 * 8/2001 Dubin et al. ............... 359/452
6,421,181 B1 * 7/2002 Yoshida et al. ............. 359/619

* cited by examiner

Primary Examiner—Hung Xuan Dang
Assistant Examiner—Joseph Martinez
(74) Attorney, Agent, or Firm—Bacon & Thomas, PLLC

(57) ABSTRACT

Micro lens systems and articles thereof that may be applied to LCD display systems and/or projection systems include carrier media layers having attached arrays of micro lens systems for modification of a light path, either horizontally and/or vertically. The micro lens systems may have light dispersing surfaces and/or may contain an isotropic light disperser, such as light diffusing particles or other types of bulk diffuser. The carrier media layers may include combinations of reflective material, highly transparent material, light absorbing material, opaque material, photosensitive film, light dispersing material, metallic material, prism-like optical material, retarding material, polarizing material and/or any other functional material to provide extra modification of optical performance. In addition, the carrier media layers may each take the form of a film, plate, sheet, or any other suitable structure with an appropriate thickness, and may be formed with transparent apertures arrays or an opaque plastic or metallic material having grids of perforations, such that light pass through the apertures in the carrier media layers with no modification. Finally, the carrier media layers may be attached to each other or other supporting materials so as to provide a more rigid structure strength.

34 Claims, 13 Drawing Sheets

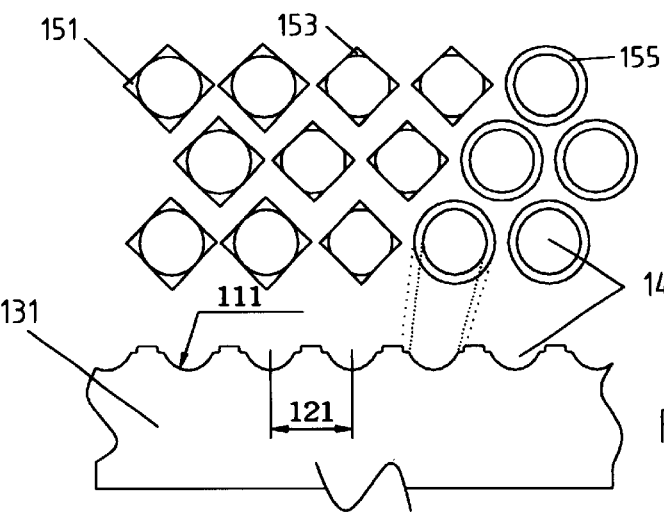
Figure 1 A.
Figure 1 B.
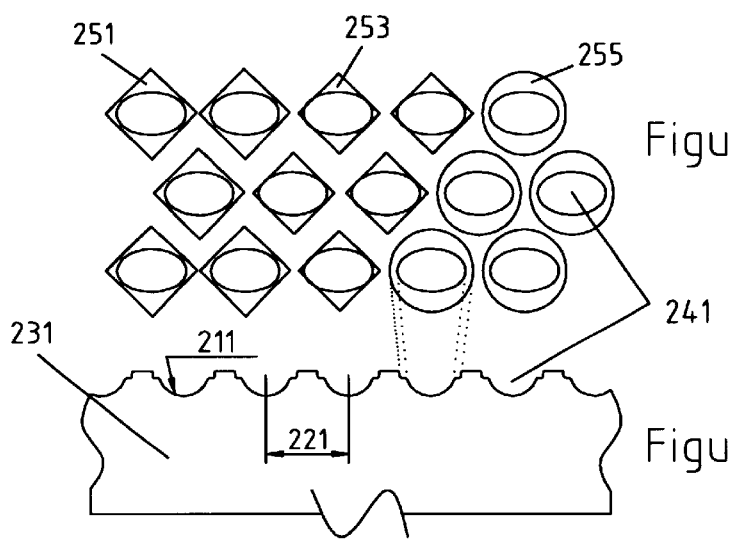
Figure 2 A.
Figure 2 B.
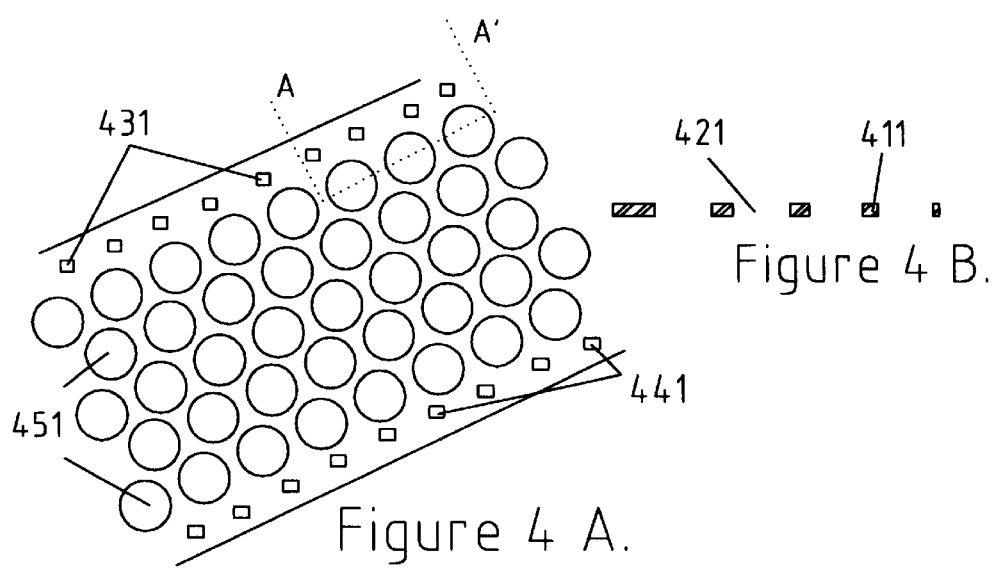
Figure 4 B.
Figure 4 A.

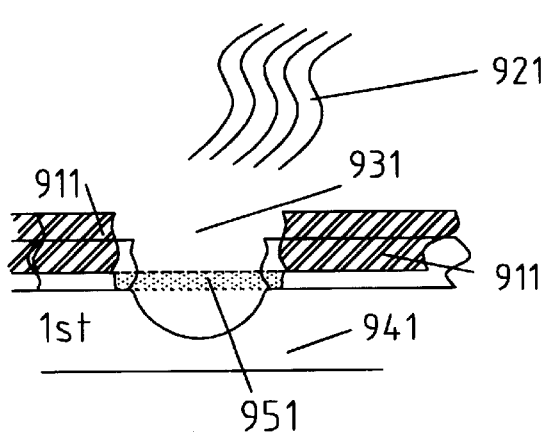
Figure 9A.
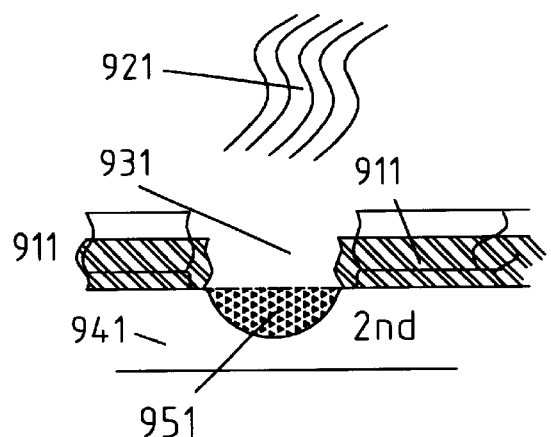
Figure 9B.
Figure 9.
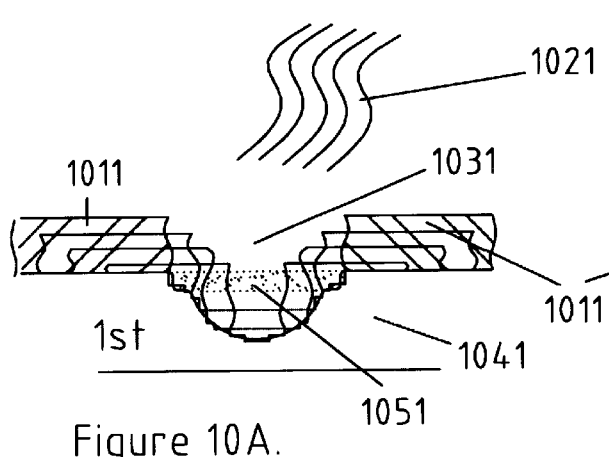
Figure 10A.
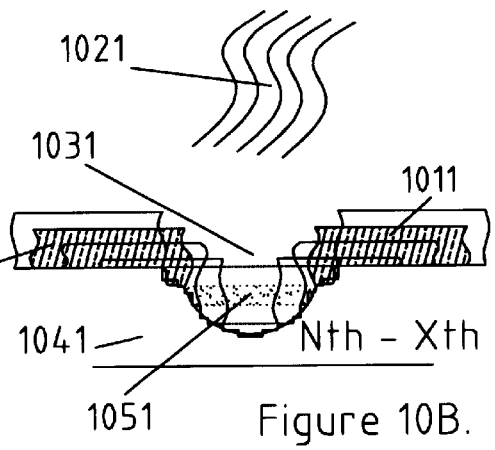
Figure 10B.
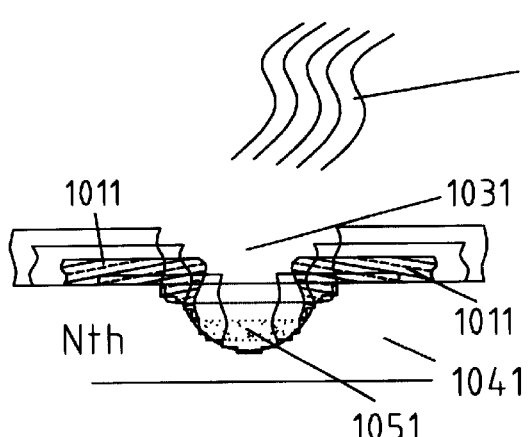
Figure 10C.
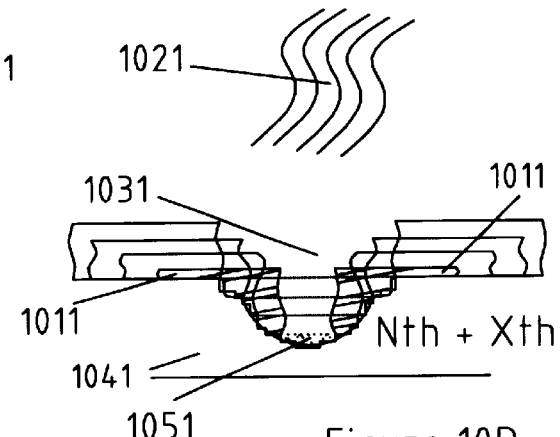
Figure 10D.
Figure 10.

MICRO LENS SYSTEMS AND ARTICLES THEREOF

BACKGROUND OF THE INVENTION

1. Field-of-the-Invention

This invention relates to light controlling composite structures for enhancing the image quality of LCD displays, projection systems, and the like. The composite structures include micro lens arrays and carrier layers having optical properties.

2. Description of Related Art

The display of images, no matter whether static or dynamic, is of great importance to our everyday life. Portable electronic equipment and other electronic equipment having low power consumption display devices are now becoming a basic necessity.

Liquid Crystal Display (LCD) are one of the major technologies used in these display devices. The LCD is a passive device that cannot emit light. External lighting is necessary to use a LCD device. For many applications of the LCD device, batteries are used as the application's only power source.

As a result, a better LCD system design needs to consider how to increase the light utilization efficiency. As indicated in FIGS. 24 and 25, a variety of optical materials and structures are typically used in order to improve the overall optical performance of an LCD display device. Nevertheless, there is a clear need for additional structures and materials that can enhance the light utilization efficiency of many of the LCD applications.

Another technology that has made great progress in recent years is the image projector. There are a variety of projector types depending on the device that is used to form the image. Some of the most recent developments include DMD (Digital Mirror Device, from Texas Instruments) projectors and LCD projectors. However, the final images from these projectors have to be displayed to the viewer via some kind of media. The display media usually have a large influence on the quality of the image a viewer sees, as do the final media that "process or touch" the image. Usually, a screen is used in such a setting. Depending on the viewer's environment and the projection principle used, the screen can either be a "front projection" or "rear projection" type. FIG. 26 indicates one of the prior art designs that provides a rear projection screen using a sheet of polymer material that forms a plurality of lenses to modify the light path. FIG. 27 is a typical rear projection screen of the prior art, wherein a single layer of optical beads is used to enhance the optical performance of the rear projection screen. FIG. 28 is yet another prior art design that uses a polymer material similar to that of FIG. 26 while providing a different lens structure for optical path modification.

The requirements for projection display devices used for each application are different. For home entertainment, the user's position in front of the display is likely to vary more in a horizontal than a vertical direction. For display devices used in a more public area, like a control room, an even wider horizontal spread is commonly encountered.

In general, it is desirable that a projection screen be capable of high resolution, high contrast, large gain and large viewing angle. But it is difficult to meet all these requirements simultaneously. For instance, the screen gain is often compromised when a larger viewing angle is requested. Tradeoffs are usually made in screen performance for each different application.

There is a need for improving the overall performance while meeting the minimum performance criteria necessary for the projection display application in which the screen is used, and in general to improve the image quality for these applications.

By way of background, conventional LCD and projector structures are shown in U.S. Pat. Nos. 4,666,248; 5,040,883; 5,467,417; 5,563,738; 5,917,664; and 6,317,263.

SUMMARY OF THE INVENTION

This invention relates generally to micro lens systems and articles thereof, and more generally, to micro lens systems and articles that may be applied to display devices suitable for use in LCD display systems and/or projection systems.

One article embodying the present invention includes carrier media layers having attached arrays of micro lens systems for modification of the light path, either horizontally and/or vertically.

The micro lens systems may have light dispersing surfaces and/or may contain an isotropic light disperser, such as light diffusing particles or other types of bulk diffuser. In either case, dispersion may be such that the direction of maximum light intensity is parallel to or at an angle relative to an axis normal to the carrier media's major surface.

The carrier media layers of the composite structure may include combinations of reflective material, highly transparent material, light absorbing material, opaque material, photosensitive film, light dispersing material, metallic material, prism-like optical material, retarding material, polarizing material and/or any other functional material to provide extra modification of optical performance. In addition, the carrier media layers may each take the form of a film, plate, sheet, or any other suitable structure with an appropriate thickness, and may be formed with transparent apertures arrays or an opaque plastic or metallic material having grids of perforations, such that light pass through the apertures in the carrier media layers with no modification. Finally, the carrier media layers may be attached to each other or other supporting materials so as to provide a more rigid structure strength.

A number of micro machining technologies are now widely used to form miniature electrical, mechanical and optical devices and composite systems of these devices. Many new devices, such as micro motors and micro gears made by these micro machining technologies are now a well defined practice. One of the best known applications of this technology is the digital micro mirror device from Texas Instruments. This device now plays a key role in improvements to image projectors.

Miniature optical elements such as micro lenses can also be made, by the use of different technical tools, with good precision. Well known technologies, such as laser ablation, photolithography, chemical etching, electroforming and electrochemical machining, etc., can be applied during the formation of the basic molding tools for the micro lens systems.

After the molding tool is formed, polymer or copolymer materials including, but not limited to, materials such as methyl methacrylate, hydroxyethyl methacrylate, polystyrene, polycarbonate, polyolefin, styrene, silicone hydrogel, siloxane, etc. or any other suitable compositions, mixed with photo-polymerization or other suitable polymerization initiator, mold release agent and/or any other suitable additives (for anti-static, anti-scratch, . . . ), can then be dispensed in precise quantities into the molding tool. The adding of the optional dispersion materials can be done during the material mixing stage.

Soon after the micro lens materials are dispensed into the molding tool, a suitable curing process is used to cure the polymer. Depending on the choice of materials, the cured polymer can have different indexes of refraction. The steps can be repeated, manipulating the material types, material properties (surface tension and affinities) and process steps to form the various micro lens systems. The resulting micro lens systems may have different optical performance.

Once the micro lens systems are formed with the present invention, the micro lens systems and articles thereof can be used to facilitate the optical functions they are designed for. One such article uses these micro lens systems to shape the light path to improve the system performance of display devices.

The carrier media layers, which may be combinations of a reflective material, a plain transparent material, a opaque material, a metallic material, a light absorbing material, a light dispersing material or other desirable functional materials, are attached to the micro lens systems via adhesive materials or by other suitable fusing method. The functional materials can have any of the following optical properties: light dispersing, light polarizing, or anti-glare properties, or combinations of such properties.

If holes are provide in the carrier media layers, the holes may be formed with precisely controlled diameters during the formation of the carrier media layers, or via a mechanical punch or laser zapping. Along the surface of the carrier media layers there can also be alignment marks (holes) made at precisely controlled positions to facilitate alignment with the micro lens systems. Once the carrier media layers are prepared according to the desired process, suitable adhesive materials can also be pre-coated onto the carrier media layers.

BRIEF DESCRIPTION OF THE DRAWINGS

FIGS. 1A and 1B show a top and a cross sectional view of a micro lens system and a molding tool for use in forming the micro lens system in accordance with the principles of a preferred embodiment of the invention.

FIGS. 2A and 2B show a top and a cross sectional view of another micro lens system and molding tool therefor constructed in accordance with the principles of the invention.

FIGS. 4A and 4B show perspective views of preferred carrier media layers constructed in accordance with the principles of the invention.

FIGS. 9A and 9B are cross sectional views showing a typical chemical etching process for forming micro lens systems molding tools.

FIGS. 10A, 10B, 10C, and 10D shows are cross sectional views showing similar typical chemical etching process steps for the preparation of the micro lens systems molding tools.

Figure 3:
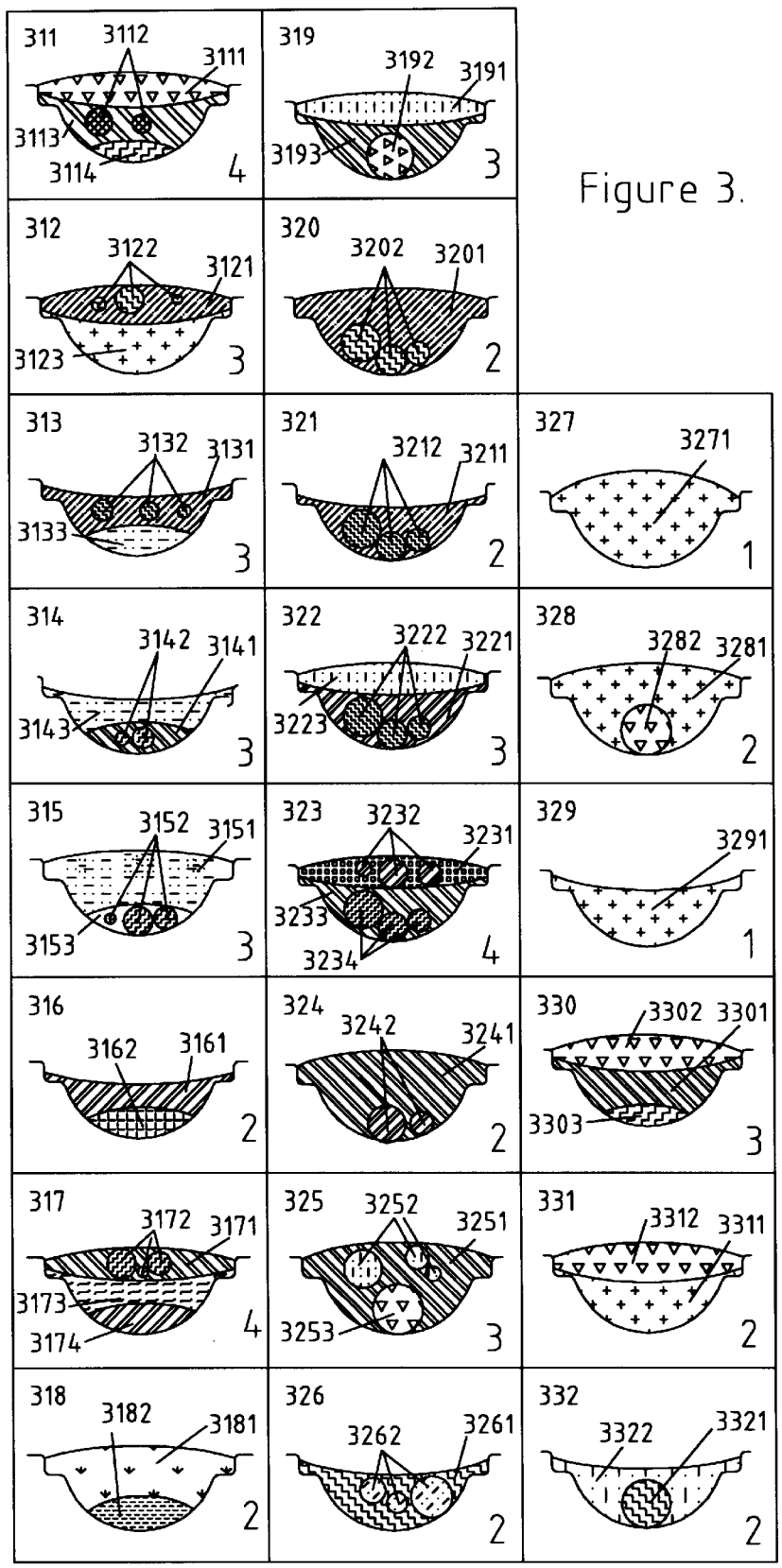
FIG. 3 shows cross sectional views of various embodiments of the present invention, indicating different possible micro lens system designs. The numeral listed in the lower right of each different configuration indicates the types of possible materials used to form the micro lens systems.

While the invention is amenable to various modifications and alternative forms, specifics thereof have been shown by way of examples in the drawings. However, the intention is not to limit the invention to the particular embodiments described. The intention is to cover all modifications, equivalents, and alternatives falling within the spirit and scope of the invention defined by the appended claims.

DETAILED DESCRIPTION OF THE PREFERRED EMBODIMENTS

The invention consists of micro lens structures and carrier layers having optical properties that are combined to form composite light controlling structures. The micro lens structures will be described first, followed by descriptions of the carrier layers, and articles that utilize the composite micro lens/carrier layer structures of the invention.

Suitable micro lens systems and micro lens system forming processes and tools are illustrated in FIGS. 1–3 and 9–16. As disclosed in FIG. 1, for example, a micro lens mold that may be used in constructing a micro lens system according to the principles of the invention includes a relatively thick, flat base (hereinafter:base) made of materials such as metal, glass, plastics or polymers (such as polyimide), on which is formed an array of micro lenses 141, the curvature, size, and related lens parameters of which are optimized to fit different applications. Once the micro lens design is fixed, the design of the micro lens array needed for a large area application can then be done. The pitch (121) and size (111) of the micro lens array is adjusted based on the requirements of the particular application. The micro lens mold rim (151, 153, 155) can have different shapes, sizes, and orientations, depending on the design of the micro lens systems array arrangement.

FIG. 2 shows an alternative to the micro lens mold of FIG. 1. The micro lens mold rim (251, 253, 255) can again have different shapes, sizes, and orientations, depending on the design of the micro lens systems array arrangement.

As can be seen from FIGS. 1 and 2, the shape (141, 241) of the micro lens system can be modified according to the application requirements and the design of the micro lens system. For example, micro lens elements can be designed to have different radii of curvature in two mutually perpendicular or other different directions. The pitch (121,221) and size (111,211) of the micro lens array can also be adjusted based on the requirements of the particular application.

The particular illustration in FIG. 2 is oval shaped micro lens systems (241), in order to provide different optical performance in different optical axis relative to the major axis of the lens surface.

The optical performance of the basic micro lens system can be further adjusted by the use of different materials during the formation of the micro lens systems. Polymer or copolymer materials can include, but are not limited to, such as methyl methacrylate, hydroxyethyl methacrylate, polystyrene, polycarbonate, polyolefin, styrene, silicone hydrogel, siloxane, etc. or any other compositions, and may be mixed with a photo-polymerization or other suitable polymerization initiator, a mold release agent and/or any other suitable additives (for anti-static, anti-scratch, and so forth), a predetermined quantity of the mixture being dispensed into the molding tool.

It will of course be appreciated by those skilled in the art that the micro lens molds illustrated in FIGS. 1 and 2 may be freely varied without departing from the scope of the invention, which is intended to cover any micro lens array suitable for combining with a carrier as described below.

Also feasible is the mixing of different materials, such as light diffusing particles or any other suitable bulk diffusers, into the polymers. The adding of the light dispersing materials can be done during the material mixing stage.

Soon after the micro lens materials are dispensed into the molding tool, a suitable curing process is used to cure the polymer. Depending on the choice of materials, the cured polymer can have different indices of refraction. The steps can be repeated, manipulating the material types, material properties (viscosity, surface tension and affinities) and process steps to form the various forms of micro lens systems. The resulting micro lens systems can have a variety of different optical performance characteristics.

FIG. 3 shows various resulting optical arrangements of the micro lens systems that can be adjusted during the micro lens system design stage to meet particular requirements. The illustrated material layers (3111/3113/3114; 3121/3123; 3131/3133; 3141/3143; 3151/3153; 3161/3162; 3171/3173/3174; 3181/3182; 3191/3193; 3201; 3211; 3221/3223; 3231/3233; 3241; 3251; 3261; 3271; 3281; 3291; 3301/3302/3303; 3311/3312; 3321) may include the same or different polymer materials, with one of the polymer layers(3113; 3121; 3131; 3141; 3153; 3171; 3201; 3211; 3221; 3231/3233; 3241; 3251; 3261) can be blended with a dispersion material (3112; 3122; 3132; 3142; 3152; 3172; 3202; 3212; 3222; 3232/3234; 3242; 3252; 3262) in order to provide the optical performance required. Additional non-polymer materials (3192; 3253; 3282; 3321) may be dispensed into the micro lens systems molding tool before the above-mentioned polymer materials (3193; 3251; 3281; 3322). These materials (3192; 3253; 3282; 3321) can be sacrificial materials, such as micro metallic bead, that can be removed after the micro lens systems polymer materials are cured. Removal of these materials can be done via a chemical etching method.

Figure 23:
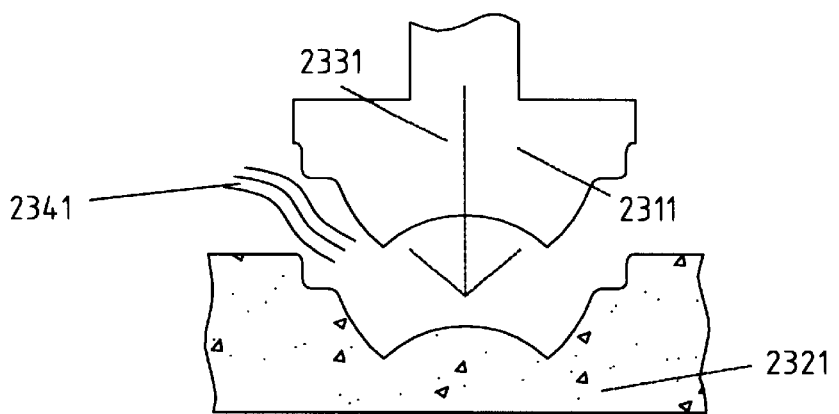
FIG. 23 is a cross sectional view of a concave micro lens systems molding tool which uses an electroforming technique to prepare the master mold for the micro lens systems molding tool.
Figure 24:
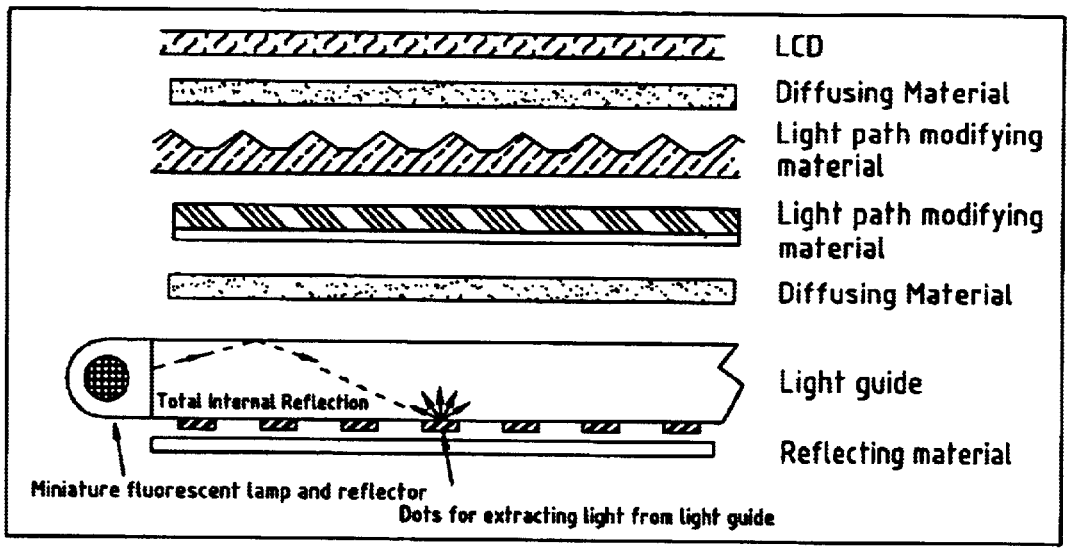
FIG. 24 shows typical prior art structures and materials used to enhance the overall optical performance of LCD display devices.
Figure 25:
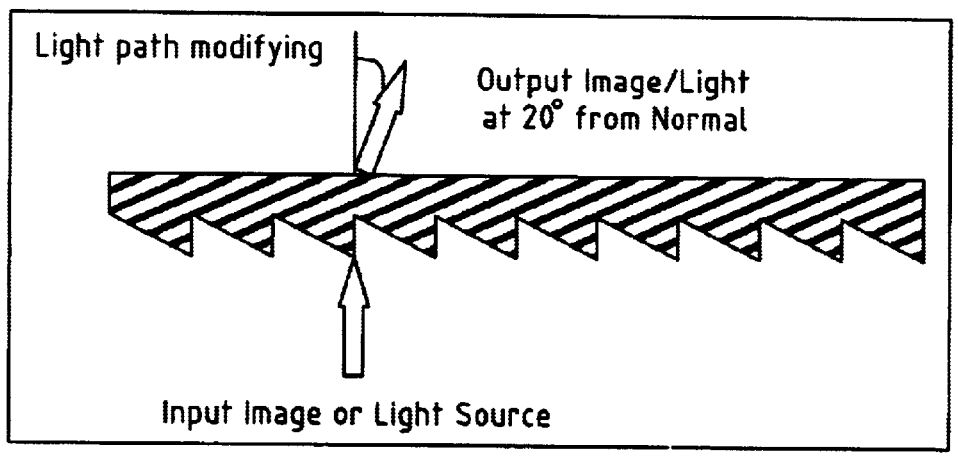
FIG. 25 shows other prior art structures and materials for modifying the optical performance of LCD display devices.
Figure 26:
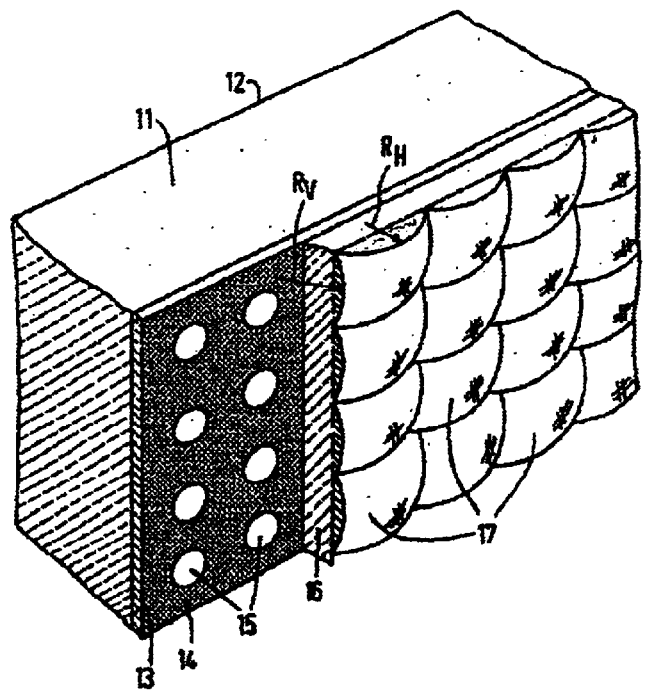
FIG. 26 shows a prior art rear projection screen that uses a sheet of polymer material to form a plurality of lenses.
Figure 27:
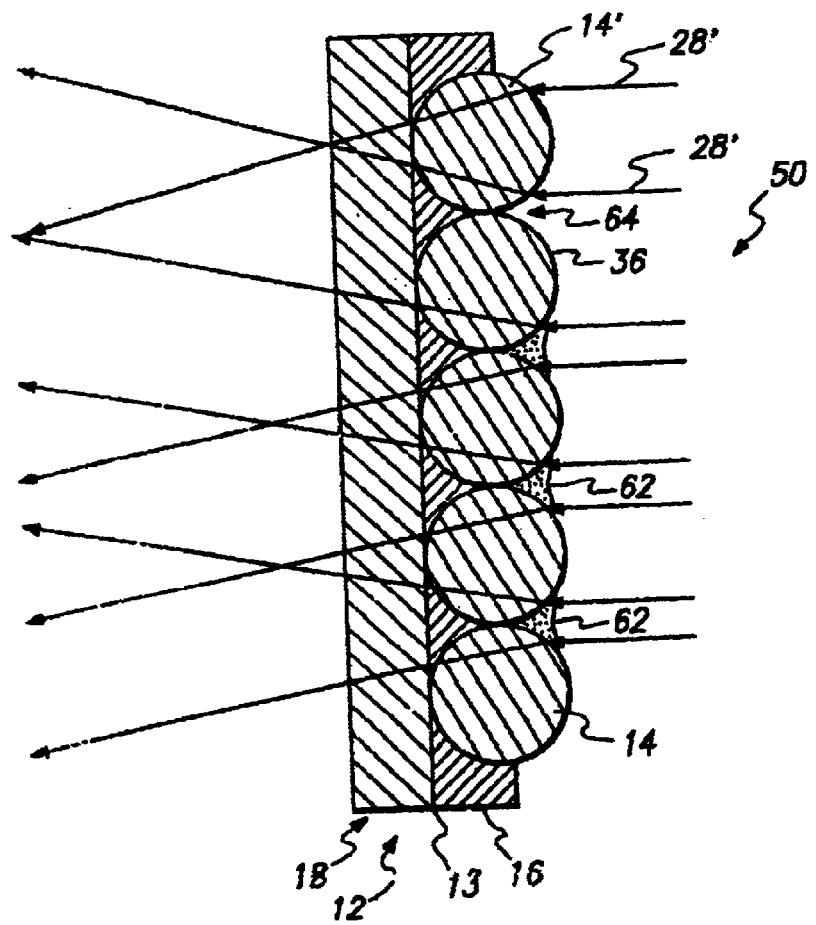
FIG. 27 indicates a typical prior art rear projection screen in which a single layer optical bead is used to provide the optical performance of the rear projection screen.
Figure 28:
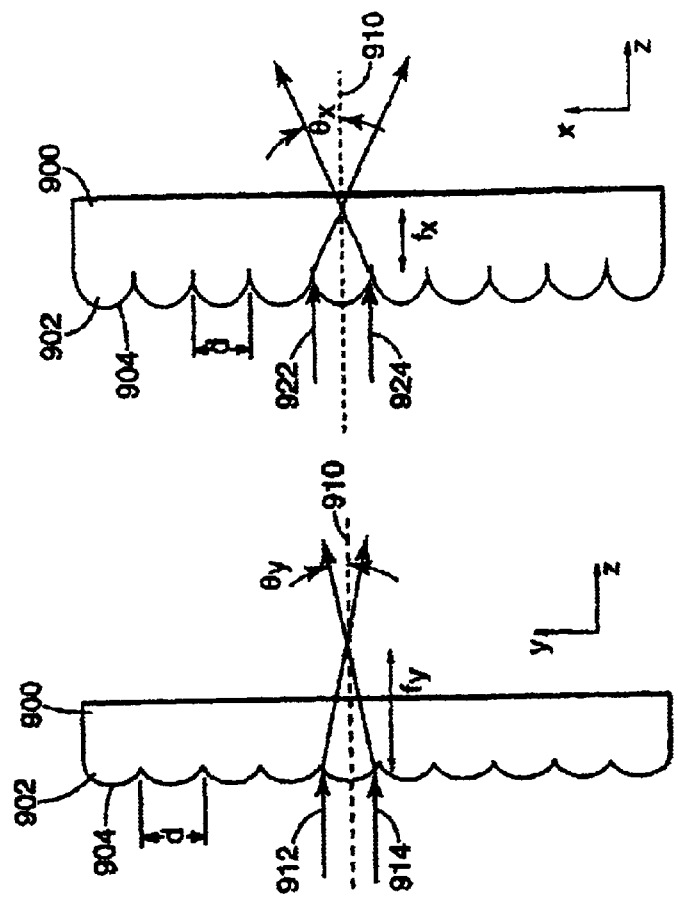
FIG. 28 shows yet another prior art rear projection screen of prior arts that uses a sheet of polymer material while providing different lens structures for optical path modification.

Although the examples disclosed in the included drawings are basically convex types of micro lens systems, concave type of micro lens systems can also be formed without deviation from the present invention. FIG. 23 shows such a concave type micro lens systems molding tool formed by a micro electrochemical technique. The micro lens systems mold forming tool (2311) is first provided by one of the generally available micro machining techniques, such as diamond turning, and then micro electrochemical machining is used to finish the micro lens systems molding tool. With a suitable choice of chemicals (2341) and process condition, such as tool moving direction (2331), tool moving speed, temperature, electrode over-voltage, etc., the micro lens systems molding tool can be precisely formed in the mold base plate (2321).

After the micro lens systems design is completed. The molding tools of the micro lens systems are formed by one of the various amenable processes to various modifications and alternative forms. Details of some of the process specifics will be shown by way of examples in the drawings and will be described in detail later on.

One such method of preparing the micro lens systems molding tool is shown in FIGS. 9 and 10. In FIGS. 9 and 10, a thin photoresist film (hereinafter:resist) (911; 1011) is coated, by spraying, dipping, spinning, roller, etc., onto the base (941; 1041). Suitable photolithography (hereinafter photo) techniques can then be used to form the opening (931; 1031) in the resist. After the opening is formed, suitable etching chemicals (921; 1021) are used to etch away the unwanted portion (951; 1051) of the base (941; 1041) in order to form the micro lens system molding tools.

Multiple resist coating, etching, resist striping steps can be repeated as shown in FIG. 10. In FIG. 10, a thin resist film (1011) is coated, by spraying, dipping, spinning, roller, etc., onto the base (1041). Suitable photo techniques can then form the opening (1031) in the resist. After the opening is formed, suitable etching chemicals (1021) are used to etch away thin layer of unwanted portion (1051) of the base (1041) in order to form the micro lens system molding tools. In the particular embodiment illustrated in FIG. 10, a successive repetition of the same process is used. During each repetition, a different size in the resist opening is formed and thin layers of the base (1051) are removed. Such repeated steps can be used to meet the micro lens system's mold profile design.

Figure 11:
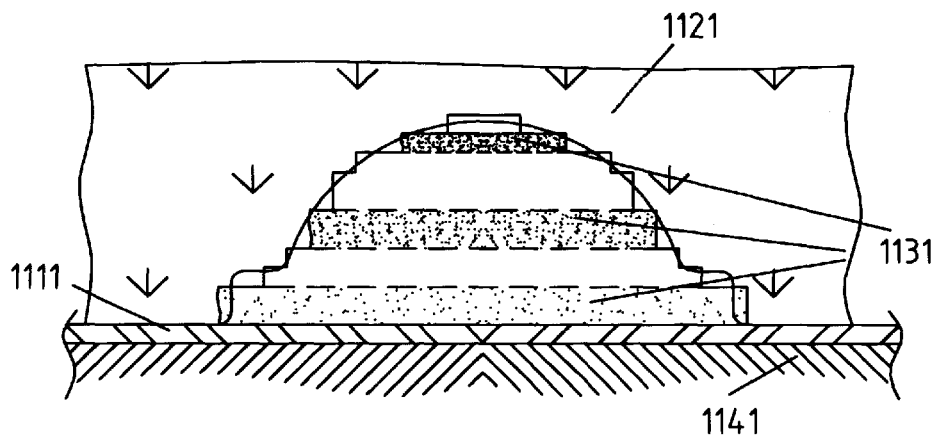
FIG. 11 is a cross sectional view of a typical electroforming process for the preparation of micro lens systems molding tools.
Figure 12:
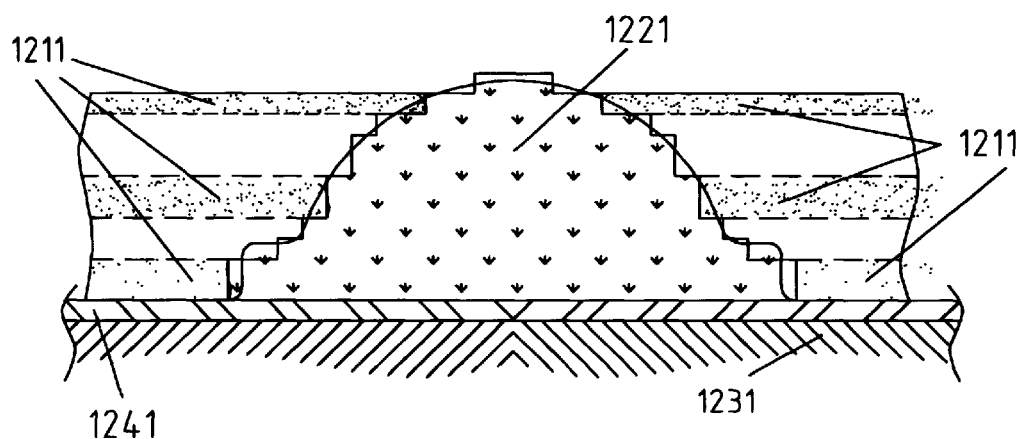
FIG. 12 is a cross sectional view of another typical electroforming process for the preparation of micro lens systems molding tools.

A similar method to prepare the micro lens systems molding tool is shown in FIGS. 11 and 12. In FIGS. 11 and 12, thin resist film (1131; 1211) is coated, by spraying, dipping, spinning, roller, etc., onto the substrate metal coating (1111; 1211). Suitable photo techniques then form the desired resist pattern. After the resist pattern is formed, suitable electroforming chemicals are used to electroform a thin metal layer (1121; 1221) on the substrate metal coating in order to form the micro lens system molding tool.

Multiple resist coating, resist patterning, electroforming, resist stripping steps can be repeated as shown in FIGS. 11 and 12 to meet the micro lens system's mold profile design. As indicated in FIGS. 11 and 12, there is a possibility of making different mold tool styles (1121; 1221), either positive or negative. The different mold tools styles can be combined with the different processes and materials described above to facilitate different methods of preparing the micro lens systems.

Figure 21:
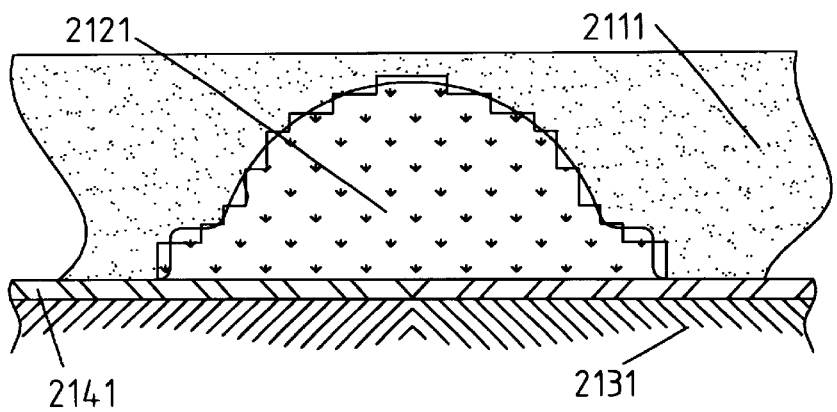
FIG. 21 is a cross sectional view illustrating a transfer molding technique for preparing a micro lens molding tool, in which an electroforming technique is used to prepare a master mold for the transfer molding tool.

In FIG. 12, a transfer molding tool (1221) for the micro lens systems is formed first by the electroforming technique onto the substrate metal coating (1211) of a glass substrate (1231) via repetition of the successive resist (1211) coating, exposure, developing, electroforming and striping process steps. This transfer molding tool is then used to form a micro lens systems molding tool. As indicated in FIG. 21, the micro lens systems transferring mold (2121) is electroformed onto the substrate metal coating (2141) of a glass substrate (2131) via repetition of the successive resist coating, exposure, developing, electroforming and striping process steps. Once formed, a suitable material such as polyimide or any other similarly appropriate compositions may then be deposited onto the transfer molding tool. After suitable curing process, the micro lens systems molding tool (2111) is formed from this transfer molding tool.

Figure 13:
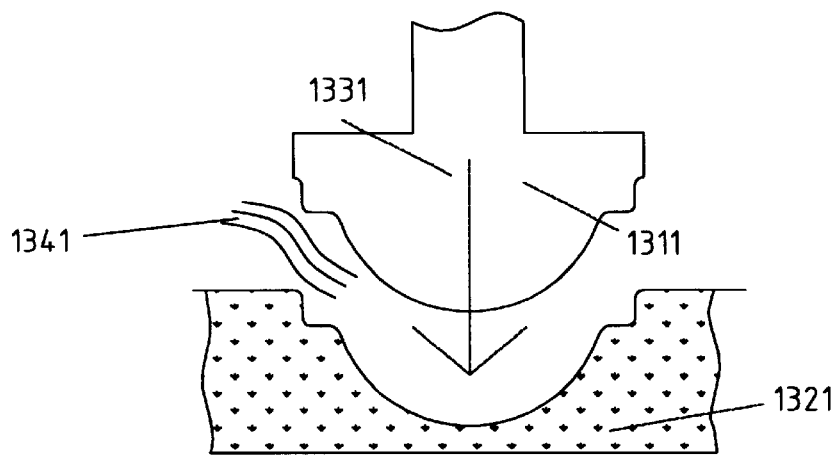
FIG. 13 is a cross sectional view of one of a typical micro electrochemical machining process for forming micro lens systems molding tools.
Figure 14:
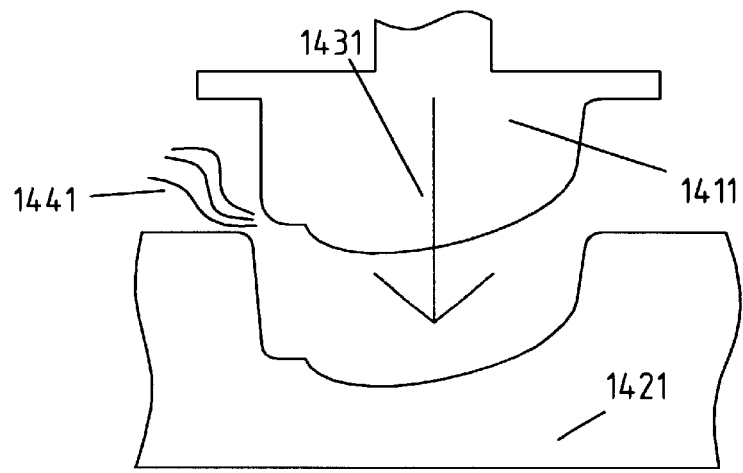
FIG. 14 is a cross sectional view of another typical micro electrochemical machining process for the preparation of yet other types of micro lens systems molding tools.

One other method to prepare the micro lens systems molding tool using micro lens machining techniques is shown in FIGS. 13 and 14. After careful adjustment based on the processing conditions, materials involved, etc., a replicate of the micro lens system is made into micro lens systems mold forming tools (1311; 1411). Such tools can be made by diamond turning or other suitable techniques. Micro electrochemical machining can then used to shape the micro lens system molding tools in the base plate (1321; 1421) via the choice of suitable micro electrochemical machining process conditions and process chemicals (1341; 1441).

FIG. 14 shows a different style of micro lens systems. In such micro lens systems, the major optical axis of the micro lens systems is basically off-axis. The off-axis major axis can be varied according to the applications. Different micro lens systems mold forming tools are used to prepare micro lens systems with different off-axis angles, according to the application requirements.

Figure 15:
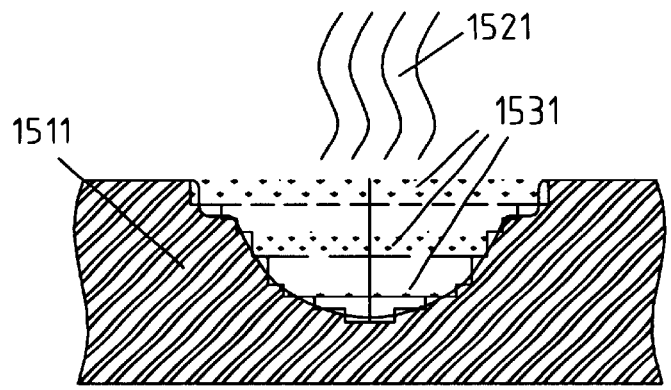
FIG. 15 is a cross sectional view showing a typical laser ablation technique for forming micro lens systems molding tools.
Figure 16:
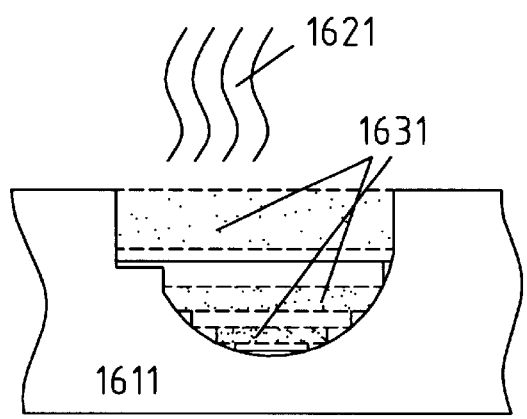
FIG. 16 is a cross sectional view showing another typical laser ablation technique for forming yet another type of micro lens systems molding tool.

Yet another micro machining method using laser ablation to prepare the micro lens systems molding tool is shown in FIGS. 15 and 16. After careful selection of the kind of laser illumination (1521; 1621) and mold base plate(1511; 1611) to be used, based on the processing conditions, materials involved, etc., successive laser ablation techniques are used to 'blast away' thin slices of materials (1531; 1631) from the base. The profile of the micro lens system molding tools in the base plate can be formed by choice of repeated laser zapping process conditions, such as laser power, laser beam size, etc.

FIG. 16 shows a different style of micro lens systems similar to the one described above in connection with FIG. 14. By careful adjustment of the laser ablation machining parameters, micro lens systems molding tools can be made, with different off-axis angles, according to the application requirements.

In addition, based on the application requirements, micro lens systems molding tools can be made according to combinations of these available techniques previously described.

To form the preferred micro lens systems using the above-described tools, precise quantities of suitable polymer mixtures are dispensed into the molding tools. Soon after the micro lens materials are dispensed, suitable curing processes are used to cure the polymer mixtures. The polymer mixture can be mixed, before dispensing, with suitable light diffusing particles or any other suitable bulk diffuser materials. Once cured, the micro lens systems is ready for further application. The micro lens systems that are formed can have light dispersing surfaces based on the micro lens systems forming tool design and/or the polymer materials that are chosen.

Articles embodying the present invention include carrier media layers to which are adhered and/or fused a plurality of micro lens system for modification of a light path, either or both horizontally and/or vertically. FIG. 4 discloses one embodiment of the carrier media layers. In this embodiment of carrier media layers (411), a plurality of holes (421; 451) of suitable diameter are formed together with a number of precisely positioned alignment guide holes (431; 441) which serve as alignment marks for aligning the carrier layers with the micro lens systems.

The carrier media layers can be a reflective material, a transparent material, a light absorbing material, an opaque material, a metallic material, a photosensitive material, a light polarizing material and/or other optical material and/or any suitable combinations of these materials.

The carrier media layers can also be coated, on one side or both side of the carrier media layers, with opaque or light absorbing photosensitive materials and then exposed with suitable light source. Hole opening in the opaque or light absorbing material is then formed in alignment with the micro lens systems that is attached to the carrier media layers.

The thickness of the layers is chosen based on the application. The general rule of thumb is to allow the micro lens system's focus to be located at a desired spatial position.

If the carrier media layers are to form a polarizing film, the direction of polarization can be modified depending on the application. For applications using LCD based displays, where the light emitted through the LCD device is usually polarized light. The polarization of the carrier media layers can either be used to allow or deny the LCD's polarized light to pass through.

Figure 5:
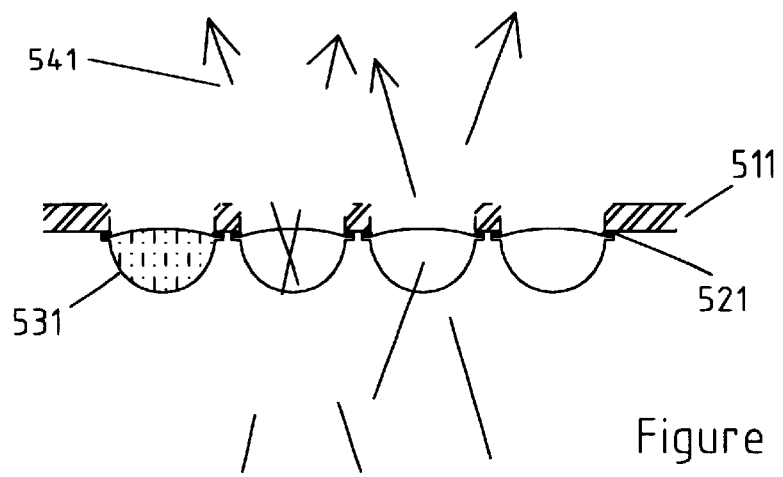
FIG. 5 shows a cross sectional view of an article that includes micro lens systems according to the present invention.
Figure 6:
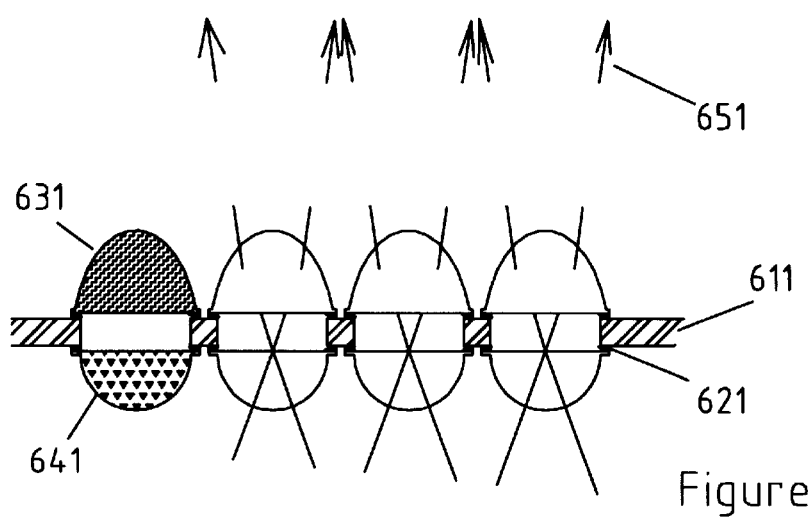
FIG. 6 shows a cross sectional view of another article that includes micro lens systems according to the present invention.
Figure 22:
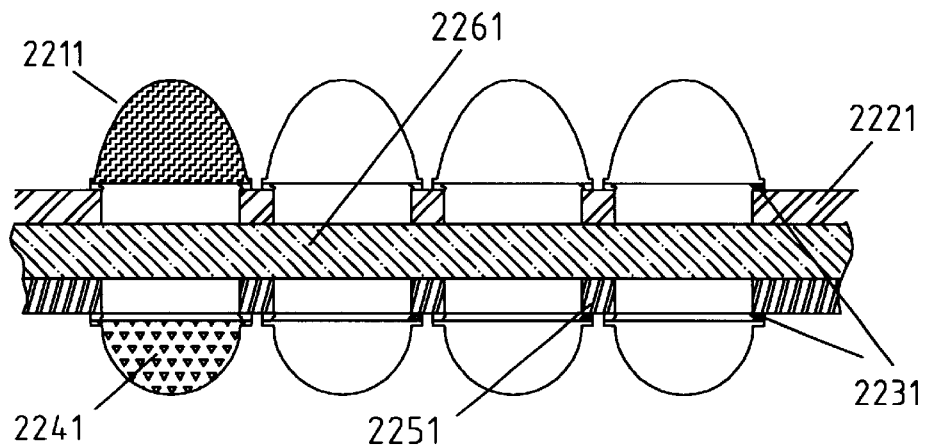
FIG. 22 is a cross sectional view of another embodiment of the present invention in which separate micro lens systems are attached to separate carrier media layers. The carrier media layers are then attached to a supporting material.

FIGS. 5, 6, 7 and 8, indicate various possible embodiments of the present invention. In FIGS. 5 and 6, a single layer of material is used for the carrier media layers (511; 611). In FIG. 5, micro lens systems (531) are attached to one side of the carrier media layer (511) with a suitable choice of adhesive materials (521). FIG. 6 includes micro lens systems (631; 641) on both sides of the carrier media layers (611) with a suitable choice of adhesive materials (621). Combining the different characteristics of the carrier media layers and the micro lens systems, different embodiments can be made for different applications. FIG. 22 indicates yet another embodiment of the present invention, in which separate micro lens systems (2211; 2241) are attached to separate carrier media layers (2221; 2251) via a suitable choice of adhesive materials (2231) and then the separate carrier layers are attached to the front surface and the back surface of a supporting material (2261).

Figure 7:
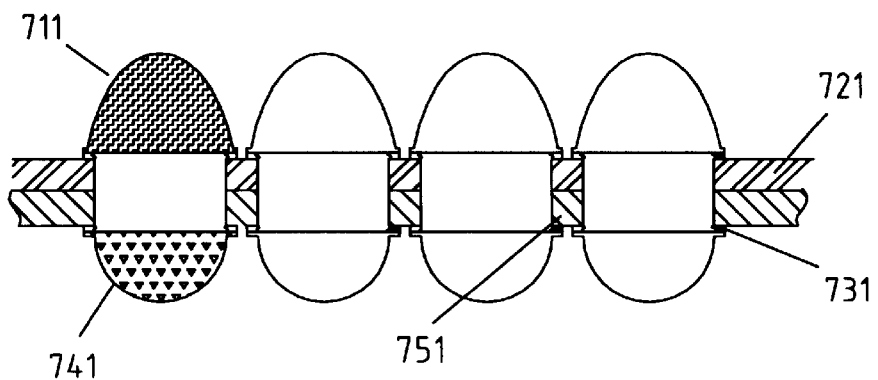
FIG. 7 shows a cross sectional view of yet another article that includes micro lens systems according to the present invention, and that further includes carrier media layers having additional optical properties, such as light dispersion or polarization.
Figure 8:
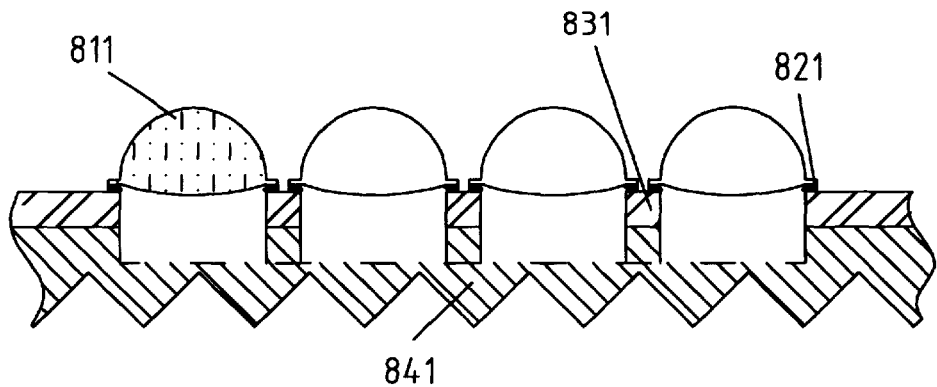
FIG. 8 shows a cross sectional view of another article that includes the micro lens systems of the present invention and carrier media layers having prism-like properties.

In FIGS. 7 and 8, double layers of materials form the carrier media layers. Combinations of a reflective material, a highly transparent material, a light absorbing material, an opaque material, a metallic material, a photosensitive material, a light dispersing material, a light retarding material, a light polarizing material and/or other functional materials can be used to form such a double layer carrier media.

In FIG. 7, micro lens systems (711; 741) are attached to the two sides of the composite carrier media layers (721; 751) with a suitable choice of adhesive materials (731). As indicated in FIG. 8, a prism-like layer (841) is used together with the micro lens systems (811), a suitable choice of adhesive materials (821),and the carrier media layers (831). Such embodiments can find use in LCD based display devices.

The micro lens systems and different layers of the carrier media can be attached together by means of, for example, a thin photopolymerisable coating such as an ultraviolet-curable material.

Based on the applications requirements and the design of the micro lens systems, the direction of the maximum intensity light need not lie parallel to an axis normal to the carrier media's major surface. Such flexibility finds its use in a number of applications.

One such application is the projection display system, in which the screen is used to relay an image into a viewing space. The viewing space of such a system may be relatively large, or relatively small. The performance of a projection screen can be described in terms of various characteristics of the screen, which typically include gain, viewing angle, resolution, contrast, the presence of artifacts such as speckle, and the like. It is generally desirable to have a projection screen that has high resolution, high contrast, a large gain, and a large viewing space.

Unfortunately, as one screen characteristic is improved, one or more other screen characteristics often degrade. For example, an increase in the screen gain usually decreases the viewing angle.

Screen embodiments utilizing the present invention can modify the light path in according with the location of the micro lens systems on the screen s that the light passing through the articles of the present invention can be more precisely directed towards the user. The carrier media layers can also be adjusted according to the application in order to enhance optical performance.

Figure 17:
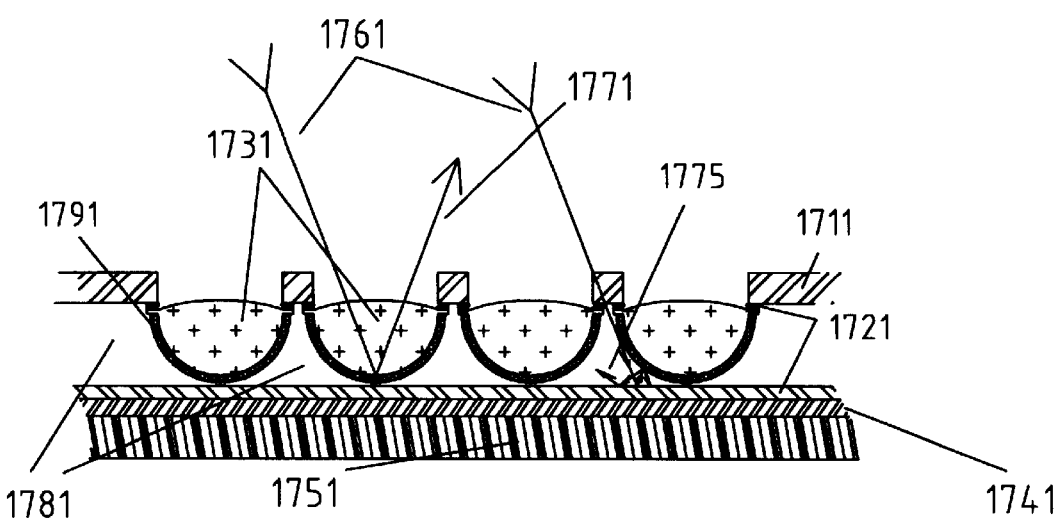
FIG. 17 is a cross sectional view of an embodiment of the invention in which an image is reflected back towards the sources.

In FIG. 17, one embodiment of the present invention is used to reflect the image back towards the image light sources. This is typical of a front projection system. By use of suitable carrier media layers (1711), adhesive materials (1721) and inter-lens space (1781) filling materials, portions (1775) of the incoming light (1761), including ambient background light, is absorbed by the carrier media layers so that extra contrast will be obtained. The inter-lens space (1781) between each micro lens systems can be filled with suitable materials to provide a different index of refraction and/or absorb the light energy incident onto it. The back of the micro lens systems (1731) can also be coated with reflective materials(1791) so that incoming light will be reflected (1771). Additional backing materials can be used to support the micro lens systems (1731) and articles thereof (1711). Backing material (1751) can be coated with highly reflective materials (1741) and adhesive materials (1721) before attachment of the micro lens systems and articles thereof.

Figure 18:
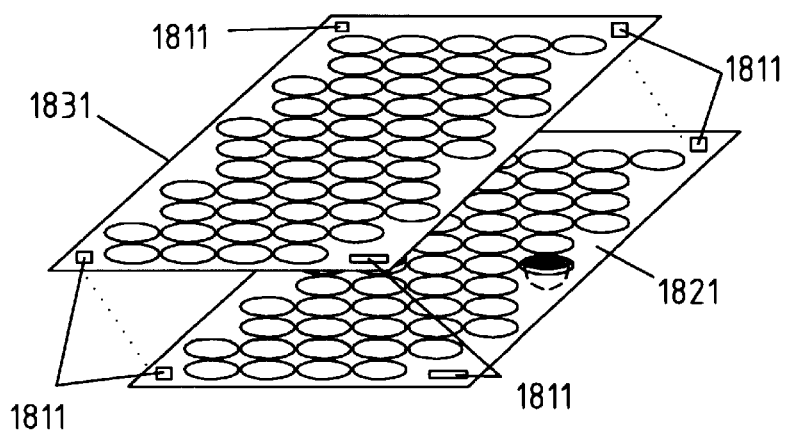
FIG. 18 shows a perspective view of an embodiment of the invention that utilizes alignment marks to align the micro lens systems with the carrier media layers.
Figure 19:
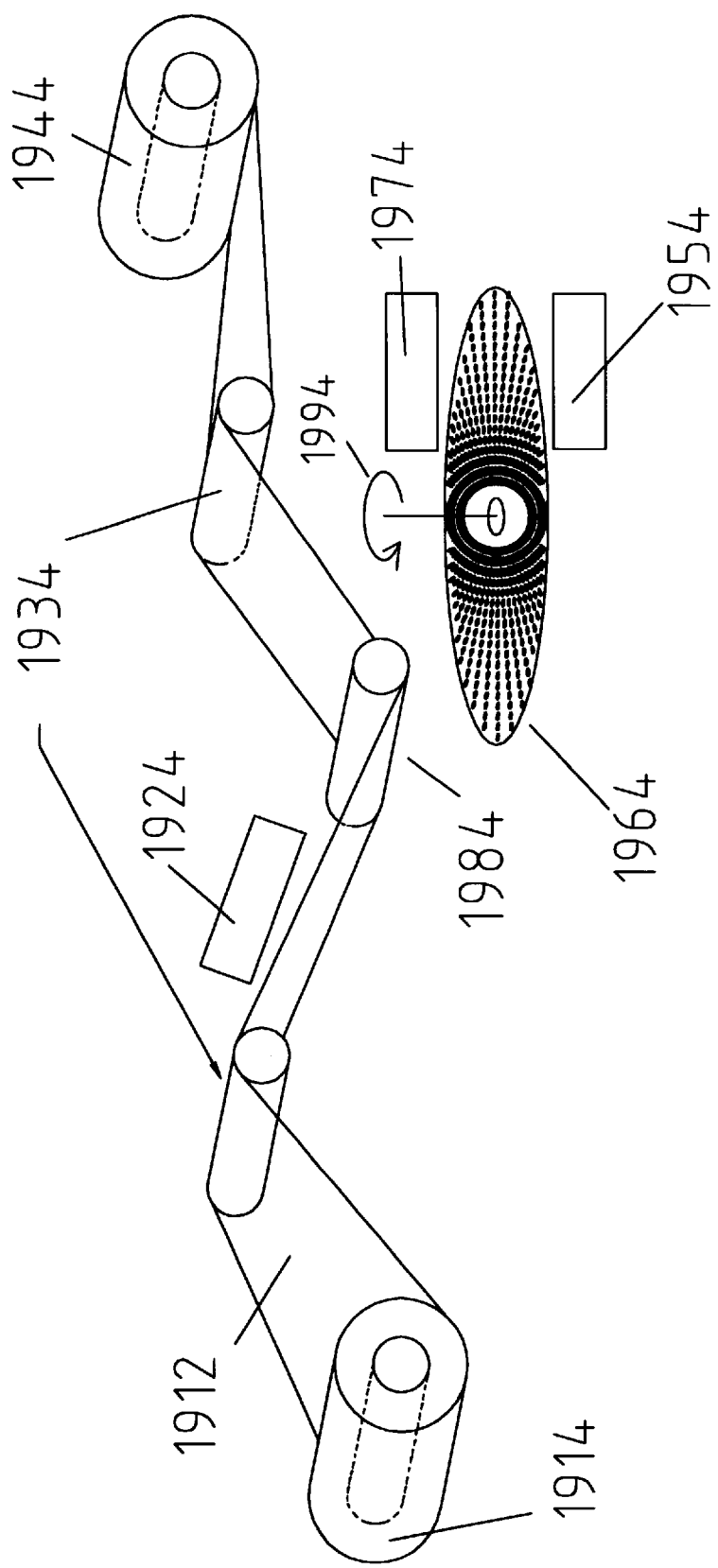
FIG. 19 is a perspective view illustrating one process used to combine the micro lens systems and carrier media layers.
Figure 20:
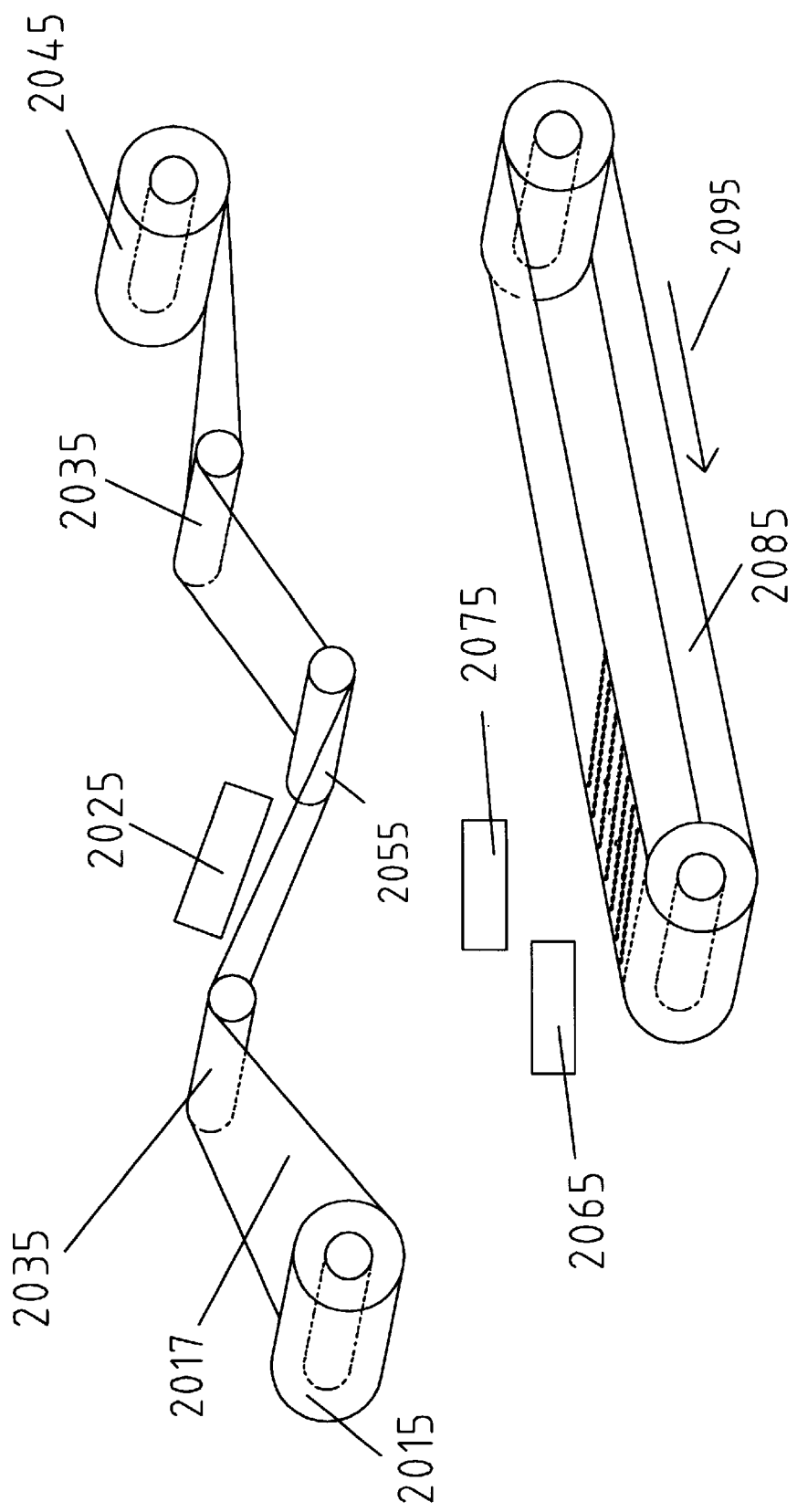
FIG. 20 shows a perspective view of another process used to combine the micro lens systems and carrier media layers.

The articles comprising the present invention can be manufactured by one of the various amenable processes with various modifications and alternative forms. Details of some of the process specifics will be shown by way of examples in the drawings and will be described in detail later on. FIGS. 18, 19 and 20 disclosed embodiments of methods of manufacturing the present invention.

In FIG. 18, the micro lens systems molding tool is presented as a plate form (1821). In the molding tool, there are alignment marks (1811) provided at precisely controlled positions. The size of the molding tool is chosen according to the application. The carrier media layers composite (1831) is also sized in the same way. Once the carrier media layers composite and the micro lens systems are formed, they are bring into position via alignment marks. With suitable adhering materials(such as a UV-curable material) and/or process parameters, the micro lens systems and the carrier media layers composite are fused together and released from the molding tool. So a batch process of manufacturing the articles embodying the present invention can be achieved.

In FIGS. 19 and 20, the micro lens systems molding tools (1964; 2085) are presented as a continuous plate form. In the molding tool, there are alignment marks provided at precisely controlled positions. The width of the micro lens systems molding tool and the carrier media layers composite (1912, 2017) is chosen according to the application. The high precision holes that will hold the micro lens system can be prepared in a off-line or in-line sequence. The micro lens systems are formed with the continuous molding tools and suitable dispensing (1974; 2065), curing (1954; 2075), and processing equipment. The reel form carrier media layers composite (1912; 2017) and the micro lens systems are then brought into position via the alignment marks. With suitable adhering materials (1924; 2025), such as UV-curable materials, and/or processing parameters, the micro lens systems and the carrier media are fused together and released from the molding tool. So a continuous process of manufacturing the articles embodying the present invention can be achieved.

As will be apparent to those skilled in the art in the light of the foregoing disclosure, many alternations and modifications are possible in the practice of this invention without departing from the spirit or scope thereof. It is to be understood that the invention is not limited to the disclosed embodiments, but on the contrary, is intended to cover all of the various modifications and equivalent arrangements included within the spirit and scope of the substance of the following claims.

What is claimed is:

1. Light controlling composite structures, comprising:
   micro lens systems and at least one carrier media layer suitable for carrying the micro lens systems;

wherein said micro lens systems are formed in molding tools, said plurality of optical micro lens systems having predetermined physical and optical characteristics including light diffusion characteristics, wherein said optical micro lens systems are attached to said carrier media layers, wherein said plurality of optical micro lens systems control paths of light incident on said optical micro lens systems in accordance with said optical and physical characteristics such that fields of light are provided, and wherein said microlens systems and carrier media layers thereby form a light diffusion screen with light guiding properties.

2. An article according to claim 1, said at least one carrier layers comprises composites selected from at least one layer of the group consisting of a reflective layer, an opaque layer, a transparent layer, a metallic layer, a photosensitive layer, a light absorbing layer, a polarizing layer, a retarding layer, a light dispersing layer, and a prism-like optical layer.

3. An article according to claim 1, wherein an image light source transmits light polarized in a first polarization direction and said at least one carrier layer further includes a polarizing layer arranged to transmit light having another polarization direction.

4. An article including a light control composite structure, comprising:

micro lens systems and at least one carrier media layer suitable for carrying the micro lens systems;

wherein said micro lens systems are formed in molding tools, said plurality of optical micro lens systems having predetermined physical and optical characteristics including light diffusion characteristics, wherein said optical micro lens systems are attached to said carrier media layers, wherein said plurality of optical micro lens systems control paths of light incident on said optical micro lens systems in accordance with said optical and physical characteristics such that fields of light are provided, and wherein said microlens systems and carrier media layers thereby form a light diffusion screen with light guiding properties.

5. An article according to claim 4, wherein said optical micro lens systems together with said carrier media layers are provided with reflective layer of materials and wherein said light control material operates in reflective mode.

6. An article according to claim 4, wherein said optical micro lens systems together with carrier media layers operate in transmissive mode.

7. An article according to claim 4, wherein said physical characteristics include index of refraction, radius, size, array pitch, profile property, optical axis inclination and degree of symmetry.

8. An article according to claim 4, wherein said optical micro lens systems include rims of various physical characteristics, and said carrier media layer includes a corresponding rim at each of the locations on which micro lens systems are to be mounted, said rims being adhered together when attaching the micro lens systems to the carrier media layers.

9. An article according to claim 4, wherein at least one of said microlens systems has optical and physical characteristics that are different than those of others of said plurality of micro lens systems.

10. An article according to claim 4, wherein said micro lens systems contain an isotropic light disperser, such as light diffusing particles or other types of bulk diffuser.

11. An article according to claim 4, wherein said micro lens systems include light dispersing surfaces.

12. An article according to claim 4, wherein the micro lens systems are arranged in periodic arrays.

13. An article according to claim 4, wherein the micro lens systems are arranged in random, non-periodic arrays.

14. An article according to claim 4, wherein said micro lens systems are symmetric in shape.

15. An article according to claim 4, wherein said micro lens systems are asymmetric in shape.

16. An article according to claim 4, wherein said micro lens systems are concave with respect to a base image source.

17. An article according to claim 4, wherein said micro lens systems are concave-concave lens systems.

18. An article according to claim 4, wherein the said micro lens systems are convex with respect to a base image source.

19. An article according to claim 4, wherein said micro lens systems are convex-convex lens systems.

20. An article according to claim 4, wherein the said micro lens systems are convex-concave lens systems.

21. An article according to claim 4, wherein said carrier media layer is a composite film, plate, or sheet, or attached to other supporting structures so as to have greater rigidity.

22. An article according to claim 4, wherein said carrier media layer is formed with an array of transparent apertures made up of an opaque material having a grid of perforations, wherein light passes through the carrier media layer apertures with no modification.

23. An article according to claim 4, further comprising at least one additional micro lens systems having optical and physical characteristics which are different from the optical and physical characteristics of said plurality of micro lens systems and said carrier media layer, and wherein said at least one micro lens system is arranged to provide a field of view which is different from the field of view provided by said plurality of micro lens systems and said carrier media layer.

24. A light control composite structure according to claim 23, wherein said at least one additional micro lens system is symmetric in shape.

25. A light control composite structure according to claim 23, wherein said at least one additional micro lens systems is asymmetric in shape and said plurality of micro lens systems are symmetric in shape.

26. A light control composite structure according to claim 23, wherein said at least one additional micro lens system is asymmetric in shape.

27. A light control composite structure according to claim 23, wherein said at least one additional micro lens system is symmetric in shape and said plurality of micro lens systems are asymmetric in shape.

28. An article according to claim 4, wherein arrays of said plurality of micro lens systems with said optical and physical characteristics are positioned at a surface of one side of said carrier media layer.

29. An article according to claim 4, wherein separated arrays of said plurality of optical micro lens systems with separate optical and physical characteristics are positioned at surfaces of both sides of said at least one carrier media layer.

30. An article according to claim 4, wherein two arrays of said plurality of micro lens systems are positioned relative to two said carrier media layers so that each surface of each said carrier media layer that does not have said micro lens systems is attached together.

31. An article according to claim 4, wherein arrays of said micro lens systems are attached to said at least one carrier media layer at one side of a supporting material.

32. An article according to claim 4, wherein separate arrays of said plurality of optical micro lens systems are attached to respective said carrier media layers and positioned at a front surface and a back surface of a supporting materials.

33. An article according to claim 4, wherein said micro lens systems are formed with said at least one carrier layer and highly reflective layers of materials backing said micro lens systems and carrier media layer, thereby making said micro lens systems and articles thereof reflective, wherein said plurality of micro lens systems reflect and control the paths of light incident on said micro lens systems.

34. An article according to claim 4, wherein said plurality of micro lens systems are formed with said at least one carrier media layer and reflective layers of materials covering said micro lens systems, thereby making said micro lens systems and articles thereof reflective, wherein said plurality of micro lens systems reflect and control the paths of light incident on said micro lens systems.

* * * * *